United States Patent [19]

Watson et al.

[11] Patent Number: 4,895,058
[45] Date of Patent: Jan. 23, 1990

[54] ECCENTRIC SPINDLE

[75] Inventors: John A. Watson, East Lansing; Thomas D. Campbell, Grand Ledge, both of Mich.

[73] Assignee: The Olofsson Corporation, Lansing, Mich.

[21] Appl. No.: 253,700

[22] Filed: Oct. 6, 1988

[51] Int. Cl.$^4$ .............................................. B23B 33/00
[52] U.S. Cl. ........................................ 82/165; 82/147; 279/6
[58] Field of Search ................. 82/142, 147, 165, 903; 279/1 J, 1 Q, 6

[56] References Cited

U.S. PATENT DOCUMENTS

| | | | |
|---|---|---|---|
| 981,566 | 1/1911 | Jarvis | 279/6 |
| 2,456,776 | 12/1948 | Faust | 279/6 |
| 2,676,501 | 4/1954 | North | 279/6 |
| 3,357,711 | 12/1967 | Fischer | 279/6 |
| 3,685,845 | 8/1972 | Fischer et al. | 279/6 |
| 4,206,932 | 6/1980 | Felker | 279/10 |
| 4,682,521 | 7/1987 | Duenas | 279/6 |

Primary Examiner—William Terrell
Attorney, Agent, or Firm—Barnes, Kisselle, Raisch, Choate, Whittemore & Hulbert

[57] ABSTRACT

Apparatus for use in cutting a workpiece on different centers. The workpiece is mounted in a chuck on a spindle top. The spindle top is mounted on the upper end of a rotatable, vertical spindle shaft adjacent to a cutting tool in different positions spaced apart laterally relative to the spindle shaft axis. When the spindle shaft is rotated with the spindle top in one position, the tool will cut the workpiece on one center. In another position of the spindle top, the tool will cut on a different center.

7 Claims, 3 Drawing Sheets

ECCENTRIC SPINDLE

This invention relates generally to metal cutting apparatus and refers more particularly to apparatus for cutting a workpiece on different centers.

BACKGROUND AND SUMMARY OF THE INVENTION

At the present time, the boring of a workpiece on two different centers is accomplished by use of two different cutting tools on a rotating tool head. The tool head bores and faces on one centerline, and then retracts and bores and faces again on a second centerline. Alternatively, separate tools on separate tool heads may be employed. The tool setup must be made with great precision and frequent tool adjustment is required due to uneven tool wear. There is a special problem in situations where the cutting action of the tools overlap, because it is difficult to adjust the tools and to adjust for wear in order to eliminate formation of a step in the blended face.

In accordance with the present invention, the workpiece rotates. A single tool fixed on a set of contouring compound slides found on any conventional lathe can do all of the multiple boring and facing and even turning on both part centerlines in one chucking. All part features are adjusted and controlled by programing of the lathe slides. Only one tool adjustment for wear is required, reducing setup time and insuring the removal of metal with great precision.

In accordance with the present invention, a work holder is mounted on a spindle shaft adjacent to a cutting tool in different positions spaced laterally relative to the spindle shaft axis. The cutting tool may bore and face the workpiece when the work holder is mounted on the spindle shaft in one position, and then in a second metal cutting operation the tool may bore and face the workpiece while the work holder is in a different position on the spindle shaft.

More specifically, the means for mounting the work holder on the spindle shaft comprises an eccentric socket in the end of the spindle shaft and an eccentric post on the work holder rotatably received in the socket. The workpiece may be shifted to different positions for cutting by merely rotating the work holder about the eccentric axis of the socket.

These and other objects of the invention will become more apparent as the following description proceeds, especially when considered with the accompanying drawings.

BRIEF DESCRIPTION OF THE DRAWINGS

FIG. 4 is a sectional view taken on the line 4—4 in FIG. 3.

FIG. 5 is an end view of a control box taken in the direction of the arrow 5 in FIG. 3.

FIGS. 6 and 7 are diagrams showing the relationship of the centerlines in the concentric and eccentric positions.

DETAILED DESCRIPTION

Figure 1:
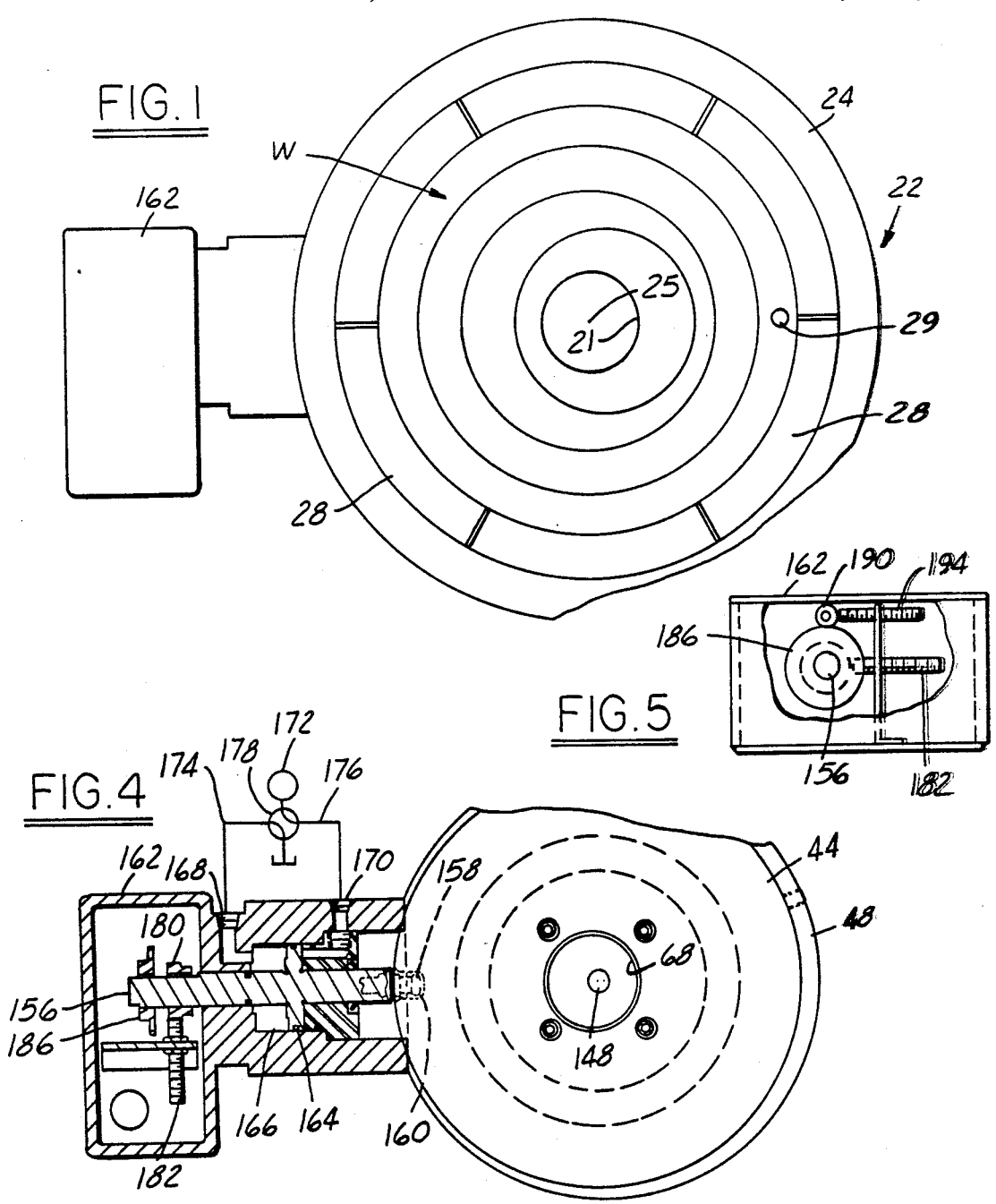
FIG. 1 is a top plan view showing a workpiece clamped to a chuck on the work holder on the upper end of the spindle shaft, taken on the line 1—1 in FIG. 2.

Referring now more particularly to the drawings, a cutting tool T is provided to bore and face a workpiece W. The cutting tool T is fixed on a head 10 mounted on a slide 12 which in turn is mounted on ways 13 for horizontal movement on a slide 14. Slide 14 is movable along vertical ways 16 . Suitable means, not shown, are provided for moving slide 12 horizontally and for moving slide 14 vertically to horizontally position the tool head and to move it toward and away from the workpiece for boring and facing.

Figure 2:
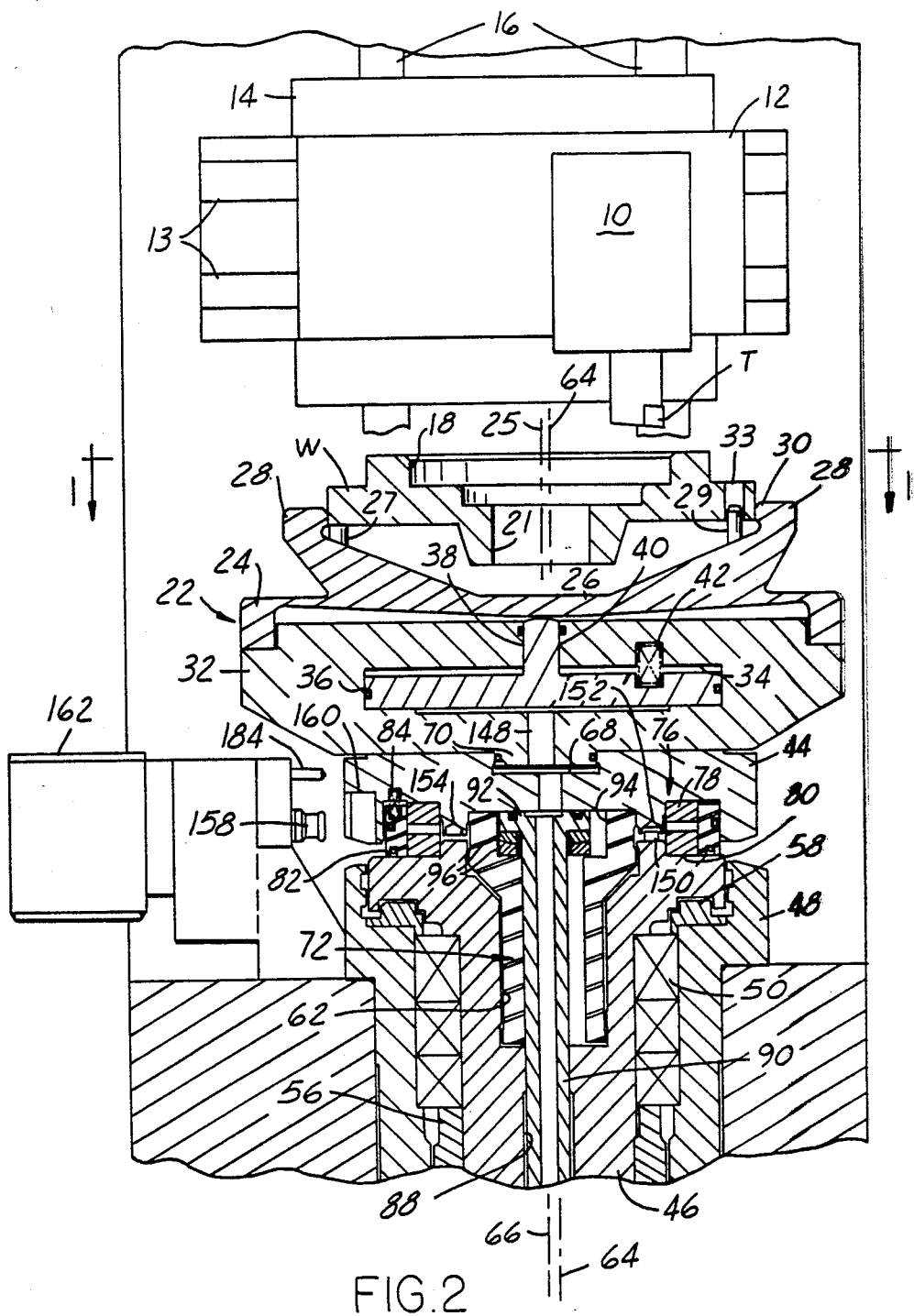
FIG. 2 is a fragmentary side elevational view, with parts in section, showing the work holder on the upper end of the spindle shaft holding a workpiece in one cutting position (the concentric position) adjacent to a cutting tool.

The workpiece W in this example is a circular pump body of a transmission oil pump in the automatic transmission of an automotive vehicle. It is shown in FIG. 2 as it appears after having been bored and faced by the cutting tool T employing the apparatus of this invention to form first a concentric recess 18 and then an eccentric recess 20. Both recesses are circular. The workpiece has a pre-formed center hole 21.

The workpiece W is mounted on a work holder 22 which includes a circular diaphragm chuck 24. The chuck has three angularly spaced supports 27 for supporting the workpiece, and a locator pin 29 which is adapted to enter a hole 33 in the workpiece to angularly locate the workpiece. The chuck has a flexible 26 base and a circular array of jaws 28 which project up from the periphery of the base and have inwardly directed terminal portions 30 which together are adapted to grip the periphery of the circular workpiece. The jaws 28 are shown in their gripping positions in FIGS. 1 and 2. When the base is flexed upwardly in the center, the jaws retract outwardly to release the workpiece. The vertical centerline of the chuck 24 and of the clamped circular workpiece and its concentric recess 18 coincide and are indicated at 25. The centerline of the eccentric recess is indicated at 31 in FIGS. 6 and 7.

The diaphragm chuck 24 is mounted on a housing 32 having a chamber defining a cylinder 34 in which a piston 36 can reciprocate vertically. A pin 38 at the center of the piston projects upwardly through a hole 40 in the housing. Springs 42 normally hold the piston in its down position in which the pin is spaced slightly beneath the base of the chuck. When the piston is moved up by air pressure, as more particularly described hereinafter, the pin contacts and flexes the chuck base upwardly to release the workpiece.

The housing 32 is affixed to a circular rotatable member 44, sometimes called a spindle top, by any suitable means. A circular pilot recess 68 in the spindle top 44 receives a circular pilot part 70 on housing 32. The spindle top is adjustably mounted on the top of a vertical spindle shaft 46 as described hereinafter.

The spindle shaft 46 is mounted for rotation in a spindle housing 48 by upper and lower bearings 50 and 52. Upper and lower bearing nuts 54 and 56 threaded on the shaft, and upper and lower bearing retainers 58 and 60 secured to the housing, are provided for retaining the bearings in proper position.

The shaft 46 has an eccentric socket 62 in the upper end. The socket has a lower cylindrical portion and an enlarged upper cylindrical portion, the two portions being concentric with each other. The longitudinal centerline 64 of the socket 62 (also of post 72, described below) is parallel to but laterally offset from the longitudinal central axis 66 of the shaft 46 (see FIGS. 2 and 3).

The circular pilot hole 68 in the spindle top 44 which receives the pilot part 70 on the housing 32 is aligned with the central vertical axis 25 of the chuck 24 but is offset relative to the center of the spindle top by an amount equal to that of the eccentric socket relative to the shaft axis.

A tubular eccentric bearing post 72 has a lower cylindrical portion and an upper cylindrical portion and is of substantially the same external configuration as the socket 62. It is journaled for rotation in the socket. The longitudinal centerline of the post coincides with the longitudinal centerline of the socket. The upper end of the post projects above the upper end of the shaft 46 and is rigidly secured to the rotatable member or spindle top 44 by fasteners 74.

A circular clamping ring assembly 76 is provided to lock the spindle top 44 to the upper end of the shaft 46 in angularly adjusted position. The centerline of the clamping ring assembly coincides with the centerline of the eccentric bearing post 72.

The clamping ring assembly comprises an upper precision tooth coupling ring 78 secured to the spindle top 44 and a lower precision tooth coupling ring 80 secured to the upper end of the shaft 46. Angular adjustment of the spindle top is made by first raising it to disengage the precision coupling rings.

A seal ring 82 surrounds the clamping ring assembly 76 to keep contamination out of the clamping ring assembly area. The seal ring is pressed down against the upper face of the spindle shaft by springs 84, and is kept from rotating during the rotatable adjustment of the spindle top by a pin 86 carried by the spindle top which enters a hole in the seal ring.

The spindle shaft 46 has a central longitudinal passage 88 in which a draw tube 90 extends. The draw tube is provided for raising the spindle top and has an enlarged head 92 disposed in an enlarged chamber at the top of the eccentric post 72. The top of the draw tube contacts the underside of the spindle top. Top and bottom spherical washers 96 surround the draw tube in the space between the head of the draw tube and the bottom wall of the recess. These washers distribute the clamping load on the bottom wall of the recess evenly when the draw tube is pulled downwardly. The upper limit of draw tube movement is determined by a stop collar 98 on the draw tube engagable with a cap 100 on the lower end of the spindle shaft.

The spindle shaft is rotated by a motor 102. A timing belt pulley 104 on the motor out-put shaft is connected to a timing belt pulley 106 on the spindle 46 shaft by a timing belt 108. The belt is a cogged belt and the peripheries of the timing belt pulleys are configured to match the pattern on the cogged belt in order to retain a predetermined relationship between the motor and the spindle shaft at all times.

An air cylinder housing 110 is secured to the timing belt pulley 106 on the spindle shaft so that the two rotate together as a unit. The lower end portion of the draw tube 90 extends through a cylinder 112 in the air cylinder housing. An integral piston 114 on the draw tube moves up or down in the cylinder 112 depending on whether air under pressure is admitted to the air cylinder above or below the piston. An actuator 116 on an extension 118 of the raw tube will make a proximity switch 120 when the draw tube is raised. An actuator 122 on the extension of the draw tube makes a proximity switch 124 when the draw tube is lowered.

Air under pressure is supplied to the opposite ends of the air cylinder 112 by passages 126 and 128 in the housing 110. These passages are connected respectively to ports 130 and 132 in a stationary union 134 which has a rotary connection with the air cylinder housing. The union is held stationary by a bracket 136 secured to the spindle housing 48.

A pump 138 supplies air under pressure selectively to ports 130 and 132 through a control valve 140. In one position of the control valve, air pressure is delivered to port 130 while port 132 is relieved of pressure, and in the other position of the control valve, air pressure is delivered to port 132 while port 130 is relieved.

Also mounted on the bracket 136 by a coupling is an encoder 142 which serves the purpose of recording and relaying information identifying the rotary position of the spindle shaft and motor shaft.

A port 144 in the union 134 is connected through a valve 146 and passage 145 in air cylinder housing 110 to the central passage 147 in the draw tube 90 at the lower end thereof to supply air pressure through a hole 148 in the housing 32 into the cylinder 34 to flex the base of the chuck 24 upwardly when it is desired to open the jaws 28 and release the workpiece.

Figure 3:
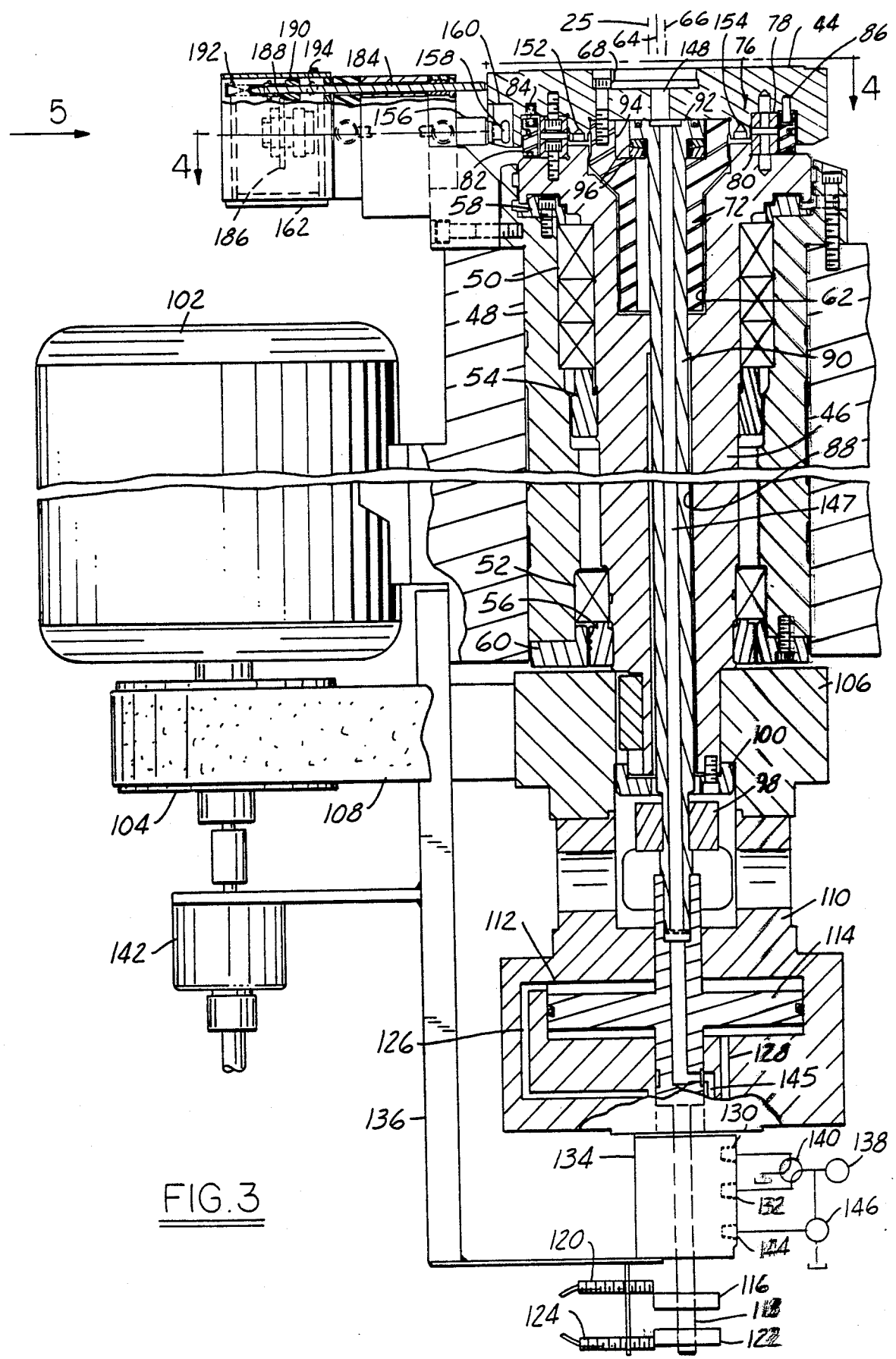
FIG. 3 is a side elevational view with parts broken away and in section, showing the work holder holding the workpiece in another cutting position (the eccentric position) adjacent to the cutting tool.

The spindle top 44 is adapted to be secured to the spindle shaft 46 by the circular clamping ring assembly 76 in either of two positions spaced 180° apart. One such position (the concentric position) is shown in FIG. 2 and the other position (the eccentric position) is shown in FIG. 3. A radial misorient pin 150 is provided for insuring that the spindle top is in one of these two positions. This pin is secured to and projects vertically upwardly from the upper end of the spindle shaft. It is adapted to fit into a recess 152 in the underside of the spindle top in the FIG. 2 position of the spindle top, and is adapted to fit in the recess 154 on the underside of the spindle top in the FIG. 3 position thereof. These two recesses 152 and 154 are obviously spaced from one another 180°.

In the FIG. 2 position, the central vertical axis 25 of the chuck 24 and workpiece W is aligned with the longitudinal axis 66 of the spindle shaft 46, and the longitudinal axis 64 of the eccentric post 72 is spaced to the right side of shaft axis 66 as viewed in FIG. 2. The center line of the eccentric recess 20 of the clamped workpiece is further right. (See FIG. 6). This is the position for boring the concentric recess 18 in the workpiece. In the FIG. 3 position, the post axis 64 shifts to the left side of shaft axis 66 and the central vertical axis 25 of the chuck and workpiece also shifts left. The centerline 31 of the eccentric recess 20 of the clamped workpiece is aligned with the axis 66 of shaft 46. (See FIG. 7). This is the position for boring the eccentric recess 20 in the workpiece.

An orient drive pin 156 is provided to locate the spindle top in the FIG. 2 position when it is advanced horizontally so that its nose 158 extends into a recess 160 in the periphery of the spindle top. The orient drive pin 156 is supported for longitudinal horizontal movement by a housing 162 mounted on the spindle housing. This pin has an integral piston 164 which moves in a cylinder 166 within the housing 162 in one direction or the other depending on which side of the piston air under pressure is admitted through the ports 168 and 170. Air under pressure is admitted to the cylinder 166 at one side of the piston or the other by a pump 172, fluid lines 174, 176 and a control valve 178. When the orient drive pin is extended longitudinally, and provided that the recess 160 in the periphery of the spindle top is properly aligned, the nose 158 of the pin will extend into the recess. When the pin is retracted, the nose will withdraw from the recess.

The orient drive pin 156 has an actuator 180 for making a switch 182 when the pin is fully advanced.

There is a spindle top position pin 184 carried by the housing 162 above the orient pin which is disposed horizontally and supported for sliding movement longitudinally from a position in which its nose contacts the circular periphery of the spindle top 44 to a withdrawn position out of contact with the spindle top.

The orient drive pin 156 has a retract disc 186 on its end opposite the nose which extends into an elongated recess 188 of an actuator 190 fixed on the end of the spindle top position pin 184 opposite its nose. When the orient drive pin is retracted, it retracts the spindle top position pin 184 out of contact with the spindle top 44. When the orient drive pin 156 is advanced to the FIG. 3 position, it permits the spindle top position pin 184 to be extended into contact with the periphery of the spindle top 44 under the pressure of spring 192. While in contact with the periphery of the spindle top 44, the spindle top position pin 184 is capable of limited longitudinal movement within the range provided by the elongated recess in the actuator 190 in which extends the retract 186 disc on the orient pin 156.

The actuator 190 makes the proximity switch 194 when the spindle top 44 is in concentric position and the spindle top position pin 184 is advanced into contact therewith.

In operation, and assuming the spindle top 44 is in the FIG. 2 position (concentric position) with the centerline 25 of the chuck 24 on the centerline 66 of the spindle shaft 46, the workpiece W is loaded into the chuck 24. At this time, the base of the chuck is flexed upwardly to open jaws 28 by air pressure applied to piston 36 from port 144. The workpiece is angularly oriented by pin 29. When the air pressure is released by valve 146, the jaws grip the workpiece.

The motor 102 is signaled to drive the spindle shaft 46 and rotate the workpiece on its centerline at a prescribed RPM.

The cutting tool T is positioned horizontally by movement of slide 12 on ways 13, and advanced toward the workpiece by downward movement of slide 14 on ways 16 to bore and face the concentric recess 18. When boring and facing are complete, spindle shaft rotation is stopped with the spindle top recess 160 facing the nose 158 of the orient drive pin 156. The encoder 142 coupled to motor 102 identifies this position of the spindle top.

The orient drive pin 156 is now advanced by pressure from pump 172 applied to port 168 of cylinder 166, causing the nose 158 of pin 156 to engage in recess 160. When pin 156 is fully advanced, proximity switch 182 will be made by actuator 180. The advance of pin 156 permits spindle top position pin 184 to advance into contact with the side wall of the spindle top 44 by pressure of spring 192. Because the spindle top is in the concentric position of FIG. 2, actuator 190 on pin 184 makes proximity switch 194, thereby identifying that position.

Proximity switch 182 signals valve 140 to deliver air pressure to the underside of piston 114, raising the draw tube 90 and raising spindle top 44. In the raised position of the spindle top, the tooth coupling rings 78 and 80 of clamping ring assembly 76 uncouple. Also in the raised position, actuator 116 makes the proximity switch 120, signaling the encoder 142 to drive motor 102 to rotate the spindle shaft 46 180° from the FIG. 2 position to the FIG. 3 position. In that process, the eccentric post 72, spindle top 44, chuck 24 and workpiece W will move laterally toward the orient drive pin 156.

The encoder 142 confirms 180° of rotation, and proximity switch 194 is unmade, whereupon a signal is sent to valve 140 to retract the piston 114 and lower the draw tube 90. The spindle top 44 lowers along with the draw tube, and the coupling rings 78 and 80 re-engage to secure the spindle top to the spindle shaft 46 in the FIG. 3 position. Actuator 122 makes proximity switch 124. Of course, if by any chance the rotation of the spindle top 44 was more than, or less than, 180°, so that radial misorient pin 150 does not align with recess 154 in the spindle top, then the spindle top will not lower as described and proximity switch 124 will not be made.

With the spindle top 44 lowered and in the FIG. 3 position (eccentric position), the valve 178 is operated to retract the orient drive pin 156.

The motor 102 is again signaled to drive the spindle shaft 46 and rotate the workpiece W at a prescribed RPM. The cutting tool T will then bore and face the eccentric recess 20, after which shaft rotation is stopped, air pressure beneath piston 114 causes the chuck jaws to release the workpiece, and the workpiece is removed.

We claim:

1. Apparatus for use in cutting a workpiece on different centers, comprising a work holder having means for supporting a workpiece, a spindle shaft having an axis of rotation, means for rotating said spindle shaft about said axis of rotation, means for mounting said work holder on said spindle shaft adjacent to a cutting tool in different positions spaced apart laterally relative to said spindle shaft axis, said mounting means comprising a rotatable member mounted on said spindle shaft for rotative adjustment on an eccentric axis parallel to and laterally spaced from said spindle shaft axis, releasable clamping means for clamping said rotatable member to said spindle shaft in selected rotative positions, said clamping means comprising cooperative clamping rings on said rotatable member and n said spindle shaft and centered on said eccentric axis, means for releasing said clamping means by moving said rotatable member axially relative to said spindle shaft to disengage said clamping rings, and, selectively operable means for retaining said rotatable member against rotation both when said clamping rings are engaged and also when they are disengaged, whereby, when said selectively operable means is operated to retain said rotatable member against rotation, said rotatable member and spindle shaft may be relatively axially moved to disengage said clamping rings, said spindle shaft may be rotated to effect a rotative adjustment of said rotatable member relative to said spindle shaft, and said spindle shaft and rotatable member may be relatively axially moved to re-engage said clamping rings and lock in said rotative adjustment.

2. Apparatus for use in cutting a workpiece on different centers, comprising a workpiece holder having means for supporting a workpiece, a spindle shaft having an axis of rotation, means for rotating said spindle shaft about said axis of rotation, means for mounting said workpiece holder on said spindle shaft adjacent to a cutting tool in different positions spaced apart laterally relative to said spindle shaft axis, said mounting means comprising a rotatable member, a cylindrical socket of circular cross-section in said spindle shaft having an eccentric central axis parallel to and laterally spaced from said spindle shaft axis, an eccentric part of circular cross-section on said rotatable member rotatably received in said socket, releasable clamping means for clamping said rotatable member to said spindle shaft in selected rotative positions, said clamping means comprising cooperative clamping rings on said rotatable member and on said spindle shaft and centered on said eccentric axis, means for releasing said clamping means by moving said rotatable member axially relative to said spindle shaft to disengage said clamping rings, and selectively operable means for retaining said rotatable member against rotation both when said clamping rings are engaged and also when they are disengaged, whereby, when said selectively operable means is operated to retain said rotatable member against rotation, said rotatable member and spindle shaft may be relatively axially moved to disengage said clamping rings, said spindle shaft may be rotated to effect a rotative adjustment of said rotatable member relative to said spindle shaft, and said spindle shaft and rotatable member may be relatively axially moved to re-engage said clamping rings and lock in said rotative adjustment.

3. Apparatus as defined in claim 2, wherein said workpiece holding means on said workpiece holder positions the workpiece so that its center is laterally offset from said eccentric axis a distance equal to the spacing between said eccentric axis and said spindle shaft axis, and wherein one of said selected rotative positions of said rotatable member is such that the workpiece center coincides with said spindle shaft axis.

4. Apparatus for use in cutting a workpiece on different centers, comprising a work holder having means for supporting a workpiece, a spindle shaft having an axis of rotation, means for rotating said spindle shaft about said axis of rotation, means for mounting said work holder on said spindle shaft in different positions spaced apart laterally relative to said spindle shaft axis, said mounting means comprising a rotatable member mounted on said spindle shaft for relative axial movement between operating and adjusting positions and for rotative adjustment on an eccentric axis parallel to and laterally offset from said spindle shaft axis, clamping means operative to clamp said rotatable member to said spindle shaft in selected rotative positions when said rotatable member is in said operating position but releasing said rotatable member when said rotatable member is in said adjusting position, means for axially moving said rotatable member to said adjusting position to release said clamping means, and selectively operable means for retaining said rotatable member against rotation when said rotatable member is in said operating position and also in said adjusting position, whereby, when said selectively operable means is operated to retain said rotatable member against rotation, said rotatable member may be axially moved to said adjusting position to release said clamping means, said spindle shaft may be rotated to effect a rotative adjustment of said rotatable member relative to said spindle shaft, and said rotatable member may be axially moved to said operating position lock in said rotative adjustment.

5. Apparatus for use in cutting a workpiece on different centers, comprising a work holder having means for supporting a workpiece, a spindle shaft having an axis of rotation, means for mounting said work holder on said spindle shaft in different positions spaced apart laterally relative to said spindle shaft axis, said mounting means comprising a rotatable member to which said work holder is secured, a socket of circular cross-section in said spindle shaft having a central axis which is parallel to and laterally offset from said spindle shaft axis, an eccentric part of circular cross-section on said rotatable member rotatably and axially slidably received in said socket so that said rotatable member may be moved axially toward and away from said spindle shaft between operating and adjusting positions respectively and may be rotatably adjusted relative to said spindle shaft when in said adjusting position, releasable clamping means for clamping said rotatable member to said spindle shaft in selected positions of rotative adjustment, said clamping means comprising a clamping ring assembly having cooperative, engageable precision tooth coupling rings on said rotatable member and on said spindle shaft and centered on the central axis of said socket, and means for moving said rotatable member axially away from said spindle shaft to said adjusting position to disengage said clamping rings and permit rotative adjustment of said rotatable member and toward said spindle shaft to said operating position to engage said clamping rings and lock in said adjustment.

6. Apparatus for use in cutting a workpiece on different centers, comprising a work holder having means for supporting a workpiece, a spindle shaft having an axis of rotation, means for axially rotating said spindle shaft about said axis of rotation, means for mounting said work holder on said spindle shaft in different positions spaced apart laterally relative to said spindle shaft axis, said mounting means comprising a rotatable member to which said work holder is secured, a cylindrical socket in said spindle shaft having an eccentric central axis parallel to and laterally spaced from said spindle shaft axis, a cylindrical eccentric part on said rotatable member rotatably received in said socket, and releasable clamping means for clamping said rotatable member to said spindle shaft in selected rotative positions, said work holder comprising a housing, a chuck on said housing having jaws normally positioned to grip a workpiece when releasing the workpiece when moved to a release position, a cylinder in said housing, a piston reciprocable within said cylinder and operative when actuated to move said jaws to release position, means providing communicating passages in said housing, rotatable member, eccentric part and spindle shaft leading to said cylinder, and means for supplying fluid under pressure through said passages to said cylinder to actuate said piston and move said jaws to release position.

7. Apparatus as defined in claim 6, wherein said chuck is a diaphragm chuck in which said jaws are moved to release position when said chuck is flexed, and actuation of said piston operates to flex said chuck.

* * * * *